March 1, 1960 G. A. LYON 2,926,958
WHEEL COVER
Filed Oct. 4, 1955 2 Sheets-Sheet 1
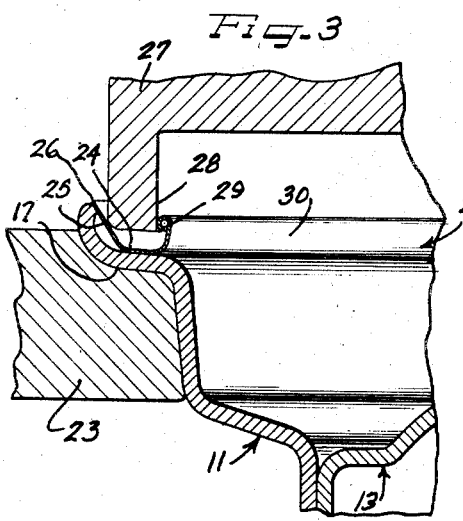
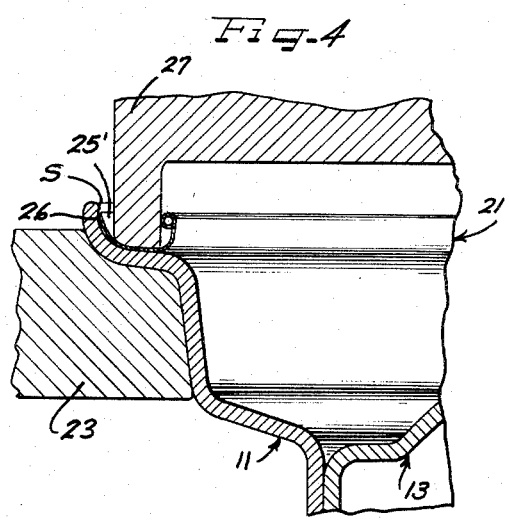
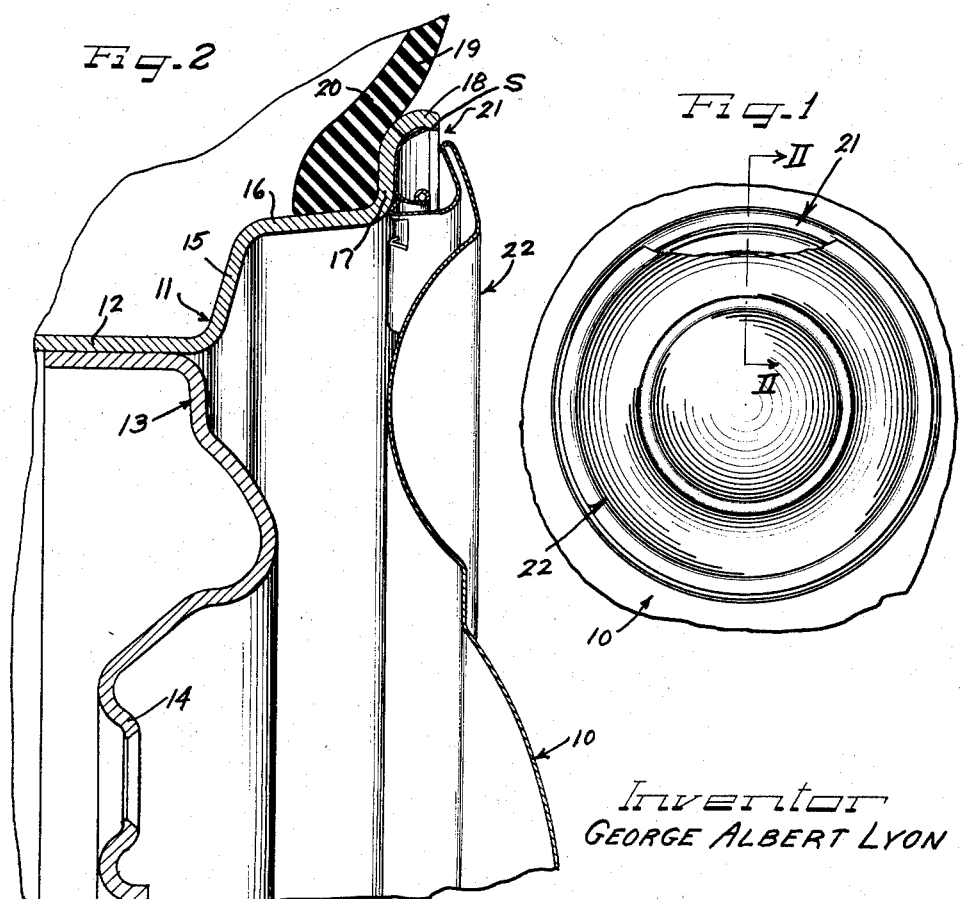
Inventor
GEORGE ALBERT LYON March 1, 1960
G. A. LYON
2,926,958
WHEEL COVER
Filed Oct. 4, 1955
2 Sheets-Sheet 2
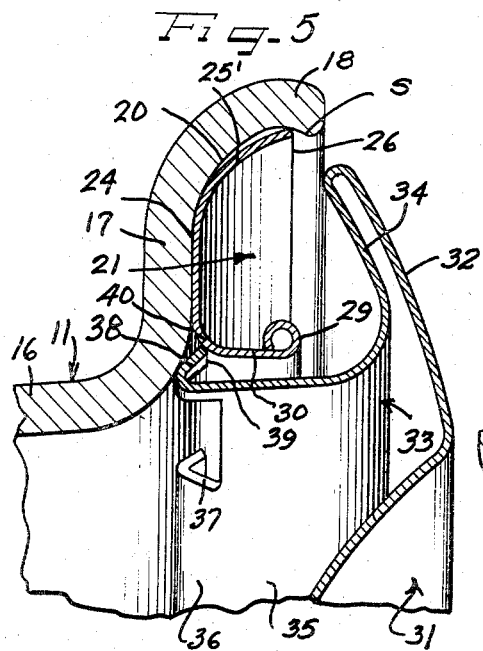
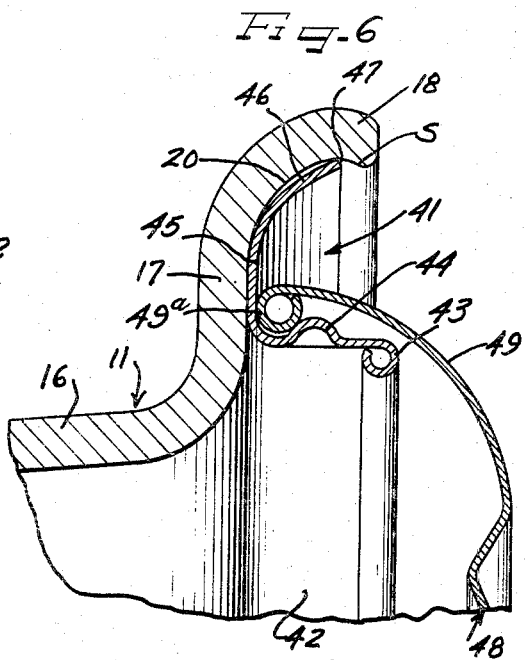
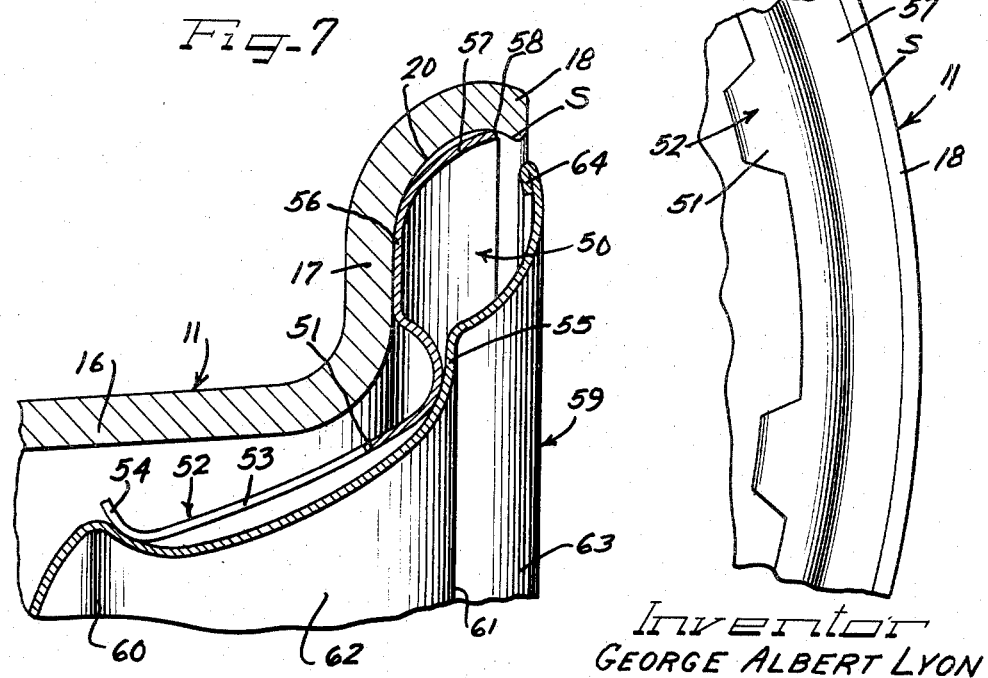
Inventor
GEORGE ALBERT LYON

United States Patent Office 2,926,958
Patented Mar. 1, 1960

2,926,958

WHEEL COVER

George Albert Lyon, Detroit, Mich.

Application October 4, 1955, Serial No. 538,310

5 Claims. (Cl. 301—37)

This invention relates generally to wheel structures and more particularly to the provision of novel means for maintaining a cover member in snap-on, pry-off relation with the wheel.

The present invention concerns itself with the provision of apparatus for interlocking an annular ring member and more specifically its outer edge to an axial flange of the wheel. In providing an annular ring member of the instant construction the cover may be attached to the wheel in an entirely new manner. As a result of the instant cooperation between the ring member and cover member, different and new ornamental shapes may be imparted to the cover, and more specifically, the cover may have a flat pancake like appearance with a slightly elevated crown area as is illustrated in Figure 2.

Accordingly, an object of the invention is to provide a new and improved mode of attaching a cover member to a wheel.

Another object of this invention is to provide a novel annular ring member capable of interlocked engagement with one of the wheel parts and having shoulder means thereon capable of cooperating with a cover member in snap-on, pry-off relation therewith.

A further object of this invention is to provide novel means for assembling a cover upon a wheel.

Still a further object of this invention is to provide a new and improved ring and cover member construction such as lends itself to economical manufacture on a large production basis.

According to the general features of this invention there is provided in a wheel structure including rim and body parts with one of the parts having a generally radial flange connected to an axial flange, an annular ring member having an annular edge in edgewise interlocked engagement with the axial flange, and a cover member for overlying disposition to said ring member, one of said members having a plurality of circumferentially spaced finger-like portions and the other having annular shoulder means whereby the cover member may be interengaged in snap-on, pry-off relation to said interlocked ring member.

A further feature of this invention relates to the provision of several modified forms of ring and cover member constructions to effect the foregoing objects and features.

Other objects and features of this invention may more fully appear from the following detailed description taken in connection with the accompanying drawings which illustrate several embodiments thereof and in which:

Figure 1 is a fragmentary front elevation of my novel wheel structure having parts broken away showing the relationship of the components;

Figure 2 is an enlarged fragmentary cross sectional view taken substantially on the line II—II of Figure 1 looking in the direction indicated by the arrows;

Figure 3 is a fragmentary view showing apparatus for interlocking my novel ring member to one of the wheel parts;

Figure 4 is a view similar to Figure 3 wherein the ring member is interlocked with one of the wheel parts;

Figure 5 is an enlarged fragmentary view of a portion of the structure shown in Figure 2;

Figure 6 is an enlarged fragmentary view of another form of my invention;

Figure 7 is an enlarged fragmentary cross sectional view of still another form of my invention; and Figure 8 is an enlarged fragmentary view of the ring member in gripping engagement with the wheel part.

As shown on the drawings:

The instant novel cover construction 10 is adapted to be retainingly maintained upon one of the parts of a wheel including a usual drop-center type tire rim 11 having an attachment flange 12 secured to a load-sustaining body part 13 which has a webbed portion 14 which may be secured to an axle of a wheel by wheel mounting bolts or any other suitable means (not shown).

The rim part 11 includes a generally radially outwardly extending flange 15, a generally axially outwardly extending intermediate flange 16, a generally radially outwardly extending flange 17 and a generally axially outwardly slightly arcuate terminal flange 18. Mounted upon the tire rim 11, as is seen in Figure 2, is a tire 19 which may be either of the tube or tubeless type and may be inflated by the usual valve stem (not shown).

Referring now more specifically to the tire rim construction it will be noted that flanges 17 and 18 define together an annular seat 20, and that the intermediate and radial flanges 16 and 17 intersect at an annular junction. In addition, as previously set out, it will be appreciated that terminal flange 18 is of a slightly arcuate cross section and accordingly the flange is slightly turned at its outer end radially inwardly to define an annular shoulder S.

My novel cover construction 10 includes an annular ring member 21 and a circular cover member 22. In the drawings it will be noted that there are several different forms of ring and cover member constructions wherein it is shown that the ring member or the cover member may alternatively be made of spring steel while the other member may be made of some other suitable material if desired. It will be appreciated that if the cover member 22 is made from some material such as aluminum or the like that the cost of the overall production of the cover may be reduced thus rendering production of same more economical.

Shown in Figures 3 and 4 is an apparatus for interlocking ring member 21 within the seat defined by flanges 17 and 18 by the exertion of a pressure in excess of manual pressure. To this end a lower die member 23 may be utilized to support the connected rim and body parts 11 and 13 respectively. Thereafter the annular ring member is centered with respect to the rim part and more particularly with reference to rim flange 17 with ring intermediate portion 24 engaged against flange 17. Connected to ring intermediate portion 24 is an annular flat portion 25 terminating in annular gripping edge 26 which is to be interlocked through the forceful action of upper die member 27 against lower die member 23.

From the foregoing it will be appreciated that the die member 27 serves to cam or deflect flat portion 25 into a generally arcuate radially and outwardly extending portion 25'. Thus as the portion 25 is deflected edge 26 is engaged behind annular shoulder S with the deflected portion 25' acting as a spring and additionally being at all times slightly axially spaced from the rim flange 18.

In the deflecting operation, it will be noted that die member 27 has an inner annular surface 28 which is adapted to bear against annular back-up bead 29 which is connected to the radial portion 24 by an axial portion 30 located radially outwardly adjacent to the junction between the intermediate and radial rim flanges 16 and 17. In so doing the force of the die member 27 is brought to directly bear upon the deflectable flat portion 25 deflecting it into a generally radially and axially outwardly arcuate portion 25'.

It will be appreciated that substantially the same die members 23 and 27 may be used in order to interlock the corresponding portions illustrated in Figures 6 and 7 in the modified forms of the instant invention.

Cooperable with the ring member 21 is my novel cover member 31 having an outer margin 32 which substantially overlies the entire tire rim and defines with the ring member 21 a cavity in which wheel weights and the like may be housed. Still further, margin 32 is provided with an underturned generally L-shaped flange structure 33 which includes a generally radially inwardly extending flange 34 and a generally axially inwardly extending flange 35 terminating in circumferentially spaced spring fingers 36. These fingers include a generally axial portion 37 and a generally radially and axially outwardly extending portion 38 each terminating in an edge 39 adapted to retainingly engage behind shoulder 40 which is positioned generally at the junction of the ring member flanges or portions 24 and 30.

In view of the foregoing it will be appreciated that the fingers are adapted to engage initially against the axially outer side of bead 29 and thereafter be progressively cammed and flexed along the axial flange 30 until they are bottomed behind shoulder 40. It is in this manner that retaining engagement between the cover member 31 and ring member 21 may be effected.

It will be appreciated that one of the fingers 36 and the shoulder 40 may be relatively stiff and the other may be relatively resilient in order to effect snap-on, pry-off engagement of the members.

Assembly of the cover member 21 upon the wheel may be effected in the manner previously set out. Assembly of the cover member 31 upon the ring member 21 may also be effected in a manner as previously set out. Removal of the cover may be effected by inserting a suitable pry-off tool underneath the outer margin 34 and upon the exertion of a levering twisting pry-off action the retaining fingers 36 may be forcfully ejected out of engagement with the shoulder 40. Ring member 21 in ordinary practice will be not removed. However, if it is necessary to remove ring member 21 a suitable pry-off tool may be utilized to eject the ring member out of engagement with the shoulder S.

In Figure 6 is shown a modified ring construction 41. The ring portion 41 includes an axial portion 42 having on the axially outer terminal end a reinforcing end and lead in service bead 43. Intermediately positioned on the axial portion 42 at circumferentially spaced intervals are a plurality of generally radially outwardly pressed retaining bumps 44. Connected on the axially inner end of radial portion 42 is a generally radially outwardly extending shortened portion 45 which in turn is connected to a generally radially and axially outwardly extending arcuate portion 46 terminating in a gripping edge 47. The retention of the instant ring member 41 may be carried out in the same manner as previously set out with the ring member 21 in the first form of my invention.

Cover member 48 is adapted to be mounted on the outer side of the wheel and includes a generally arcuate radially outwardly axially inwardly extending margin 49 terminating in an annular gripping bead portion 49a. Assembly of the cover member 48 with ring member 41 may be carried out by centering the cover member 48 with respect to the ring member 41 with bead 49a engaging against bead 43. Upon the exertion of an axial force, the bead 49a may be progressively urged over bumps 44 into retaining engagement therebehind.

In view of the foregoing it will be appreciated that one of the bumps 44 and annular bead 49a may be relatively stiff and the other may be relatively resilient in order to effect snap-on, pry-off engagement of the ring and cover members. As is shown in Figure 6, however, the axial flange 42 is the relatively rigid member while annular bead 49a is the relatively resilient member. Thus, in this respect, the form shown in Figure 6 is the same as that shown in Figure 5 since axial portion 39 in Figure 5 is relatively stiff while the fingers 36 are adapted to flex thereover behind the shoulder 40.

Removal of the cover member 48 may be effected by inserting a suitable pry-off tool underneath the edge or bead 49a and upon the exertion of a levering twisting pry-off force the cover 48 may be ejected from engagement with the ring member 41. As in the first form of the invention, ring member 41 will not ordinarily be removed. However, if it is necessary a suitable pry-off tool may be utilized to remove the ring member 41 in much the same manner as in the first form of my invention.

Figures 7 and 8 illustrate still another form of my invention and include an annular ring member 50 which includes a generally axial portion 51 having circumferentially spaced retaining finger-like extensions 52 positioned at circumferentially spaced intervals therearound. Each of the finger-like extensions 52 includes a relatively long axial leg 53 and a relatively short terminal leg 54.

At the axially outer end of axial portion 51 is an annular rib 55 which serves a purpose as will subsequently become apparent. Connected to this portion 55 is a generally radially outwardly extending back-up portion 56 connected at its outer end to a generally radially and axially outwardly extending arcuate portion 57 terminating in a gripping edge 58.

Assembly of the ring member 50 may be effected in much the same manner as in the other forms of the invention since it is contemplated that edge 58 is to be retainingly engaged behind shoulder S.

A cover 59 is adapted to be retainingly carried by ring member 50. The cover 59 is generally circular in configuration as is the case with the other forms of the invention. In this instance, however, cover member 59 is provideded with two spaced ribs 60 and 61 joined together by a generally radially and axially outwardly extending arcuate portion 62. Connected to the other end of rib 61 is a generally radially and axially outwardly extending arcuate portion 63 terminating in an underturned bead 64. The portion 63 is adapted to overlie the outer portion of the tire rim and more particularly the ring member 50. Separating the ring member 50 and the cover portion 63 is a cavity which may be utilized to house wheel balancing weights and the like.

In the assembly of the instant cover upon ring member 50, the cover is first centered with respect thereto and therefter is urged axially inwardly with fingers 52 being progressively flexed along cover portion 62 until the rib like portion 55 is snapped behind the shoulder defined by rib 61. In assembly, the fingers 52 when stressed are adapted to exert a retaining force such as tends to urge the cover outwardly against the cover 59 and more particularly rib 61 and in that manner maintains the components in unitary relation.

In view of the foregoing it will be appreciated that one of the fingers and cover portion 52 and 63 may be made relatively stiff and the other may be made relatively resilient in order to effect snap-on, pry-off engagement of the members. In the illustrated embodiment however, the fingers are preferably shown to be resilient while the cover member portion 63 is relatively rigid.

Removal of the cover member 59 may be completed by inserting a suitable pry-off tool underneath the outer margin 63 and thereafter exerting a levering twisting pry-off force sufficient to disengage finger portion 54 from rib 60 so as to release the tensioned engagement between portion 55 and rib 61.

Ordinarily it is not contemplated that ring member 50 be removed from the cover. However, if it is desired, the ring member 50 may be removed by inserting a suitable pry-off tool thereunder and forcefully ejecting the cover 50 out of engagement with the rim.

In view of the foregoing description it will be appreciated that in all forms of my invention there is found a ring member having an edge which is adapted to be retainingly engaged behind a shoulder S on the rim flange 18. It will be perceived that in each form of the invention there is provided a generally radially outwardly extending portion which is adapted to bottom against the rim flange 17 and a generally radially and axially outwardly extending portion having a terminal edge engageable behind the aforesaid shoulder. This last mentioned portion however, is preferably maintained in slightly spaced relation to the rim in order to exert a force sufficient to hold the edge behind the shoulder.

Another aspect of the present invention is found in the fact that in the several forms of the invention there is found an axial ring member portion and an axial cover member portion in confronting relation with one another. These axial portions are provided with means for retainingly maintaining the cover with the ring member on the wheel in snap-on, pry-off engagement.

It will be understood that modifications and variations may be effected without departing from the scope of the novel concepts of the present invention.

I claim as my invention:

1. In a wheel structure including rim and body parts with the rim part having a generally axial terminal flange provided with shoulder means and an annular tire rim junction radially spaced from the shoulder means defined at the intersection of intermediate and radial rim flanges, a ring member having means for retaining cooperation behind said shoulder means, said ring member having shoulder means thereon, and an outer cover member for overlying disposition to said tire rim having circumferentially spaced retaining fingers for retaining cooperation with said ring member shoulder means, said ring member having a generally axially outwardly extending portion with said ring member shoulder means thereon in confronting relation to said fingers with said axial portion being disposed generally radially outwardly of the tire rim junction, one of said fingers and shoulder means being relatively resilient to permit snap-on, pry-off assembly of said members.

2. In a wheel structure including rim and body parts with the rim part having a generally axial terminal flange provided with shoulder means and an annular tire rim junction radially spaced from the shoulder means defined at the intersection of intermediate and radial rim flanges, a ring member having means for retaining cooperation behind said shoulder means, said ring member having shoulder means thereon, and an outer cover member for overlying disposition to said tire rim having circumferentially spaced retaining fingers for retaining cooperation with said ring member shoulder means, said ring member having a generally axially outwardly extending portion with said ring member shoulder means thereon in confronting relation to said fingers with said axial portion being disposed generally radially outwardly of the tire rim junction, said fingers being relatively resilient and said axial portion having a beaded extremity to rigidify same and provide a lead-in surface upon which the fingers may be flexed.

3. In a wheel structure including a tire rim having an intermediate generally axially outwardly extending flange joining a generally radially outwardly extending flange portion joining a generally axially outwardly extending terminal flange portion, a cover retaining ring having a generally radially and axially outwardly extending radially outer portion retainingly engaging said axially extending terminal flange portion, the ring bottoming against the radially extending flange portion and having an axially outwardly extending annular radially inner portion disposed radially inwardly adjacent to the juncture between the intermediate flange and radially extending flange portion of the tire rim, said axially extending ring portion providing a generally axially inwardly facing shoulder structure, and a circular cover member of a diameter to overlie the ring and having a turned terminal thereon engageable in press-on, pry-off relation with said shoulder structure of the axially extending radially inner portion of said ring.

4. In a wheel structure including a tire rim having an intermediate generally axially outwardly extending flange joining a generally radially outwardly extending flange portion joining a generally axially outwardly extending terminal flange portion, a cover retaining ring having a generally radially and axially outwardly extending radially outer portion retainingly engaging said axially extending terminal flange portion, the ring bottoming against the radially extending flange portion and having an axially outwardly extending annular radially inner portion disposed radially inwardly adjacent to the juncture between the intermediate flange and radially extending flange portion of the tire rim, said axially extending ring portion providing a generally axially inwardly facing shoulder structure, and a circular cover member of a diameter to overlie the ring and having a turned terminal thereon engageable in press-on, pry-off relation with said shoulder structure of the axially extending radially inner portion of said ring, said shoulder structure on the axially extending ring portion being located at the radially inner side thereof adjacent juncture with the remainder of the ring and the turned retaining terminal structure on the cover comprising terminal flanges on retaining fingers on an axial flange telescopically related to said axially extending ring portion.

5. In a wheel structure including a tire rim having an intermediate generally axially outwardly extending flange joining a generally radially outwardly extending flange portion joining a generally axially outwardly extending terminal flange portion, a cover retaining ring having a generally radially and axially outwardly extending radially outer portion retainingly engaging said axially extending terminal flange portion, the ring bottoming against the radially extending flange portion and having an axially outwardly extending annular radially inner portion disposed radially inwardly adjacent to the juncture between the intermediate flange and radially extending flange portion of the tire rim, said axially extending ring portion providing a generally axially inwardly facing shoulder structure, and a circular cover member of a diameter to overlie the ring and having a turned terminal thereon engageable in press-on, pry-off relation with said shoulder structure of the axially extending radially inner portion of said ring, said shoulder structure on said axially extending ring portion comprising a circumferentially spaced series of generally radially projecting retaining bumps spaced axially outwardly relative to said radially extending flange portion of the rim and the terminal structure of the cover member comprising a turned bead of a diameter to engage retainingly with said bumps.

References Cited in the file of this patent

UNITED STATES PATENTS

| Re. 19,467 | Lyon | Feb. 12, 1935 |
| 2,127,598 | Horn | Aug. 23, 1938 |
| 2,158,125 | Horn | May 16, 1939 |
| 2,231,932 | Lyon | Feb. 18, 1941 |
| 2,326,788 | Lyon | Aug. 17, 1943 |
| 2,386,239 | Lyon | Oct. 9, 1945 |
| 2,410,174 | Lyon | Oct. 29, 1946 |